Patented Oct. 7, 1924.

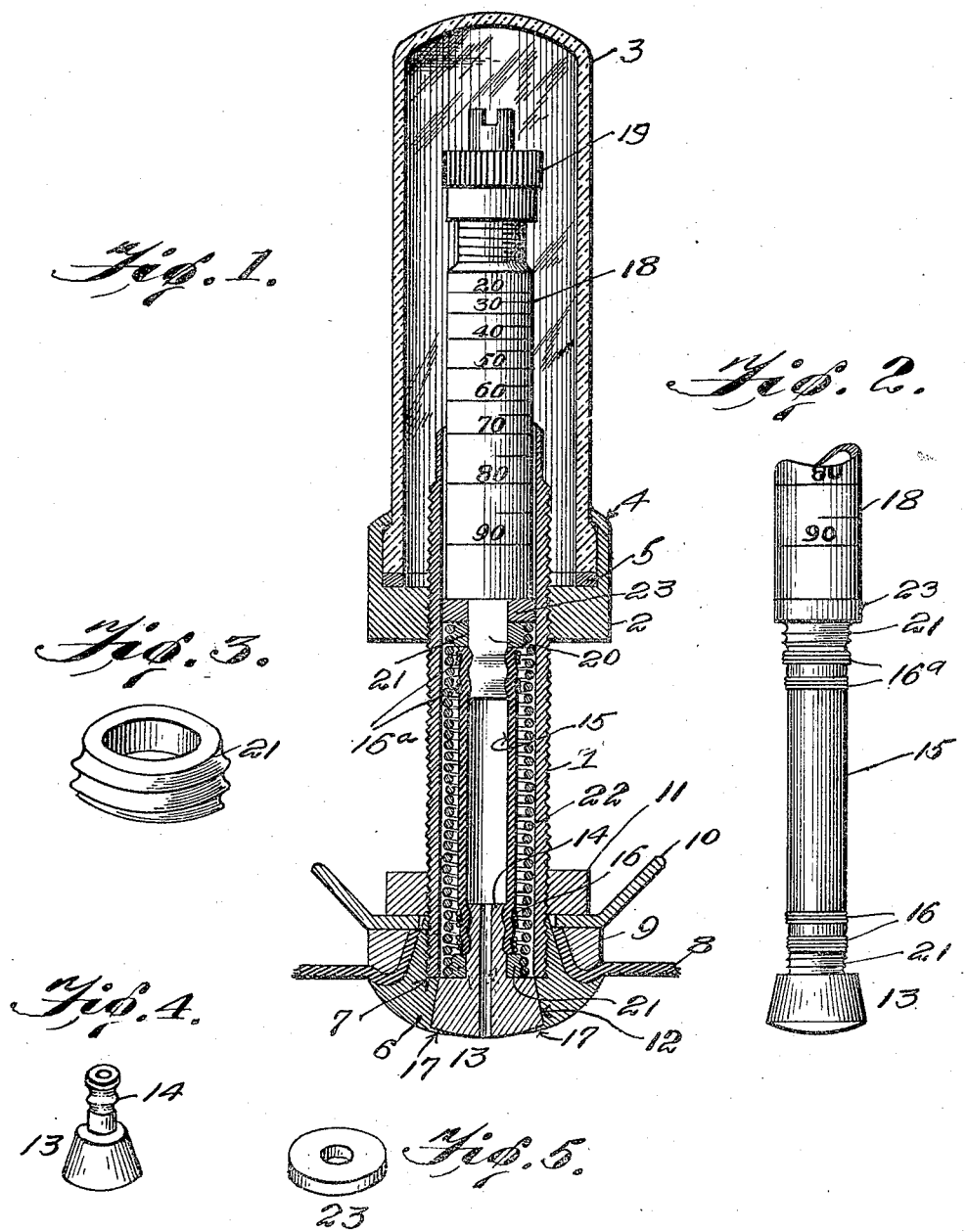

1,510,856

UNITED STATES PATENT OFFICE.

CLARENCE S. MUNRO, OF CHARLESTON, WEST VIRGINIA, ASSIGNOR TO TIREGAGE VALVE CORPORATION, OF CHARLESTON, WEST VIRGINIA, A CORPORATION OF WEST VIRGINIA.

REGISTERING VALVE.

Application filed June 18, 1923. Serial No. 646,228.

*To all whom it may concern:*

Be it known that I, CLARENCE S. MUNRO, a citizen of the United States, residing at Charleston, in the county of Kanawha and State of West Virginia, have invented certain new and useful Improvements in Registering Valves, of which the following is a specification, reference being had therein to the accompanying drawings.

This invention relates to a registering valve or a "tire gauge" valve, and the object of the invention is the production of a comparatively simple and efficient device, that comprises a minimum number of parts, and which is durable and efficient in operation.

With this and other objects in view, my invention comprises certain novel combinations, constructions and arrangements of parts as will be hereinafter described, illustrated in the accompanying drawings, and more particularly pointed out in the appended claims.

In the drawings:

Figure 1 is a vertical, central, sectional view of a device or structure, constructed in accordance with the present invention.

Figure 2 is a fragmentary view of the device, showing parts in elevation.

Figure 3 is a perspective view of one of the two collars of the device.

Figure 4 is a perspective view of the plug device.

Figure 5 is a perspective view of the absorbent washer.

Referring to the drawings by numerals, 1 designates the hollow stem which is externally screw-threaded throughout its entire length.

Threaded upon stem 1 is the nut 2 that receives the inner or lower end of the fragile casing 3; this casing 3 is preferably formed of glass and, consequently, to minimize the number of casings lost in construction, by reason of breaking the same, when the portion 4 is formed over against the glass in any suitable manner, I provide a yieldable or rubber washer 5, interposing the same between the body of the nut 2 and the extreme inner end of the glass casing 3, so that there is a slight yielding action obtainable when the nut is fastened upon the casing 3, at 4. I have found from actual experience that without my yieldable washer 5 a large percentage of the glass casings are crushed or broken in the assembling process, but by reason of my invention the assembling of the nut and the fragile casing 3 is accomplished with efficiency, greatly reducing the number of casings 3 that would otherwise be crushed or broken while assembling.

A head 6 is threaded upon the inner or lower end of the stem 1, and this head is provided with a shoulder 7, so that the stem 1 can be quickly threaded to its proper position upon the head, without any exacting measurements being required, since the inner end of stem 1 will be properly seated when it comes in contact with the shoulder 7 of the head. The inner tube 8 is placed against the head (Fig. 1) with the clamping washer 9 pressing against said tube, and plate 10 rests against clamping washer 9, with nut 11 screwed tightly against plate 10 to hold the inner tube tightly clamped against the head 6.

The head 6 is provided with a cone-like socket 12 in which is seated the plug device 13; the body of the plug device is conical 13; and extending from the body is a tit 14, upon which tit 14 is placed one end of the rubber tubing 15. The end of rubber tubing 15 upon tit 14 is fastened thereon by suitable fastening means, such as wire 16, Fig. 1. All that is necessary to fasten the plug device 13 in the socket 12 is to press over a part of the metal of which head 6 is formed, at 17; it will be seen that when the metal is pressed over at 17, by reason of the conical structure of socket 12, the plug device cannot be forced too far into the head 6.

The gauge plunger 18 is placed in stem 1, with a cap 19 on its outer end. The gauge plunger shows through the casing 3, to permit the observer to readily read the indicating numerals on the plunger. The inner end of the gauge plunger 18 is provided with a tit 20, which is exteriorily constructed similar to the tit 14. Upon tit 20 is placed the other end of the rubber tubing, and suitable fastening means, such as wire 16ª, secures the tubing upon the tit 20. Two collars 21, of similar structure, are employed, one being placed upon tit 14 and another being placed upon tit 20, and these collars are provided with external, spiral grooves upon which the ends of coil spring 22 easily thread; these collars 21 serve as a fastening means for holding the ends of the coil spring upon or over the tits, the spring 22 acting as a yieldable protecting means for the rubber tubing 15, as well as being properly tested for registering the air pressure, sufficiently to permit the gauge plunger to project into the glass casing for properly and accurately indicating the pressure of the air in the inner tube 8.

Mounted upon the tit 20, against the inner end of the gauge plunger 18, is an absorbent washer 23, which washer prevents liquid, such as water, passing into the interior of the device, as the water has been found, under test, to be absorbed by the washer thereby preventing it from passing into the device and thus the efficiency of the device is greatly increased by reason of water, or other foreign substances, such as dust, not passing into the interior of the device.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a device of the class described, the combination with a stem, of a head on said stem, a plug device provided with a tit in said head, a gauge plunger provided with a tit in said stem, a rubber tubing on said tits, collars provided with spiral grooves on said tits, a packing of absorbent material on the tit of the gauge plunger between the collar carried thereby and the gauge plunger, and a spring threaded in the spiral grooves of said collars and having a portion surrounding the rubber tubing.

2. In a device of the class described, the combination with a stem, of a head on said stem, a gauge plunger in said stem, absorbent means in said stem and engaging said gauge plunger, and means forming communication between the head and the gauge plunger.

3. In a device of the class described, the combination with a stem, of a head on said stem, a gauge plunger in said stem and provided with depending means, an absorbent washer on said depending means, and means on said depending means and connected to said head forming a communication between the head and the gauge plunger.

4. In a device of the class described, the combination with a stem, of a head on said stem, a gauge plunger in said stem, said gauge plunger provided with a tit, an absorbent washer on said tit against the inner end of said gauge plunger, and means connected to said tit and also connected to the head forming a communication between the head and the gauge plunger.

In testimony whereof I hereunto affix my signature.

CLARENCE S. MUNRO.